(12) United States Patent
Morita et al.

(10) Patent No.: US 11,865,993 B2
(45) Date of Patent: Jan. 9, 2024

(54) DRIVER'S SEAT AIRBAG DEVICE

(71) Applicant: Autoliv Development AB, Vargarda (SE)

(72) Inventors: Kazuki Morita, Kanagawa (JP); Kazuhiro Abe, Kanagawa (JP); Hiroyoshi Shimono, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/596,611

(22) PCT Filed: May 25, 2020

(86) PCT No.: PCT/JP2020/020488
§ 371 (c)(1),
(2) Date: Dec. 14, 2021

(87) PCT Pub. No.: WO2020/255638
PCT Pub. Date: Dec. 24, 2020

(65) Prior Publication Data
US 2022/0297629 A1 Sep. 22, 2022

(30) Foreign Application Priority Data
Jun. 18, 2019 (JP) .................................. 2019-113003

(51) Int. Cl.
*B60R 21/2165* (2011.01)
*B60R 21/203* (2006.01)
*B60R 21/215* (2011.01)

(52) U.S. Cl.
CPC ...... *B60R 21/21656* (2013.01); *B60R 21/203* (2013.01); *B60R 21/2165* (2013.01); *B60R 2021/21543* (2013.01)

(58) Field of Classification Search
CPC . B60R 21/203; B60R 21/215; B60R 21/2165; B60R 21/21656; B60R 2021/21543
See application file for complete search history.

(56) References Cited

U.S. PATENT DOCUMENTS 4,995,638 A * 2/1991 Shinto ............... B60R 21/21656
280/731
5,060,971 A * 10/1991 Nanbu ............... B60R 21/21656
280/728.3

(Continued)

FOREIGN PATENT DOCUMENTS

DE 102006029424 A1 * 1/2008 ......... B60R 21/2165
JP 7-32964 A 2/1995

(Continued)

OTHER PUBLICATIONS

CD-ROM of the specification and drawings annexed to the request of Japanese Utility Model Application No. 74319/1992 (Laid-open No. 32223/1994) (Ashimori Industry Co., Ltd.) Apr. 26, 1994, entire text, all drawings.

*Primary Examiner* — Laura Freedman
(74) *Attorney, Agent, or Firm* — Foley & Lardner LLP

(57) ABSTRACT

A driver side airbag device with an airbag module including a steering wheel, an inflator, and a cushion. The steering wheel includes a housing portion that stores the airbag module and a cover member that seals the housing portion. The cover member has a design region on an occupant side, and a thin-walled portion formed from an upper portion region to a lower portion region of the design region that is cleaved open by an expansion pressure of the cushion to open cover doors. The thin-walled portion has a first plate thickness portion and a second plate thickness portion that is thinner than the first plate thickness portion. The second plate thickness portion is formed in the lower portion region of the design region.

13 Claims, 11 Drawing Sheets

(56) References Cited

U.S. PATENT DOCUMENTS

| | | | | |
|---|---|---|---|---|
| 5,505,483 | A * | 4/1996 | Taguchi | B60R 21/2035 280/728.2 |
| 5,730,460 | A * | 3/1998 | Niederman | B60R 21/21656 280/731 |
| 6,142,510 | A * | 11/2000 | Endo | B60R 21/21656 280/731 |
| 6,168,189 | B1 | 1/2001 | Dennis | B60R 21/2165 280/731 |
| 6,247,722 | B1 * | 6/2001 | Brodi, Jr. | B29C 45/372 280/731 |
| 6,550,803 | B1 * | 4/2003 | Derrick | B60R 21/2165 280/732 |
| 6,568,704 | B2 * | 5/2003 | Iida | B60R 21/21656 428/31 |
| 6,626,458 | B2 * | 9/2003 | Fujita | B60R 21/2037 280/731 |
| 6,994,372 | B2 * | 2/2006 | Ford | B60R 21/2035 280/728.2 |
| 7,390,013 | B2 * | 6/2008 | Chavez | B60R 21/21656 280/731 |
| 7,484,754 | B2 * | 2/2009 | Yamachi | B60R 21/21656 280/731 |
| 7,703,799 | B2 * | 4/2010 | Takagi | B60R 21/21656 280/731 |
| 7,766,381 | B2 * | 8/2010 | Fujimori | B60R 21/21656 280/731 |
| 7,988,189 | B2 * | 8/2011 | Hayashi | B60R 21/21656 280/731 |
| 8,465,048 | B2 * | 6/2013 | Hayashi | B60R 21/2155 280/731 |
| 8,894,093 | B2 * | 11/2014 | Jung | B60R 21/21656 280/731 |
| 9,321,420 | B2 * | 4/2016 | Kwon | B60R 21/21656 |
| 9,694,780 | B1 * | 7/2017 | Lowe | B60R 21/21656 |
| 11,358,561 | B2 * | 6/2022 | Ishii | B60R 21/217 |
| 2002/0005631 | A1 * | 1/2002 | Varcus | B60R 21/203 280/731 |
| 2002/0050704 | A1 * | 5/2002 | Abe | B60R 21/21656 280/743.1 |
| 2003/0209889 | A1 * | 11/2003 | Erwin | B60R 21/21656 280/728.3 |
| 2005/0079305 | A1 * | 4/2005 | Krappmann | B29C 45/73 264/327 |
| 2010/0201105 | A1 * | 8/2010 | Iwazato | B60R 21/21656 280/731 |
| 2021/0316689 | A1 * | 10/2021 | Honma | B60R 21/2338 |
| 2022/0144201 | A1 * | 5/2022 | Morita | B60R 21/239 |
| 2022/0144202 | A1 * | 5/2022 | Morita | B60R 21/2035 |
| 2022/0379832 | A1 * | 12/2022 | Abe | B60R 21/203 |

FOREIGN PATENT DOCUMENTS

| | | | | |
|---|---|---|---|---|
| JP | 7-277126 | A | | 10/1995 |
| JP | H11105657 | A * | | 4/1999 |
| JP | 2000-177522 | A | | 6/2000 |
| JP | 2001-30864 | A | | 2/2001 |
| JP | 2001071853 | A * | | 3/2001 |
| JP | 2001163156 | A * | | 6/2001 |
| JP | 2002193059 | A * | | 7/2002 |
| JP | 2003276546 | A * | | 10/2003 |
| JP | 2006273244 | A * | | 10/2006 |
| JP | 3991739 | B2 | | 10/2007 |
| JP | 2011140309 | A * | 7/2011 | .......... B60R 21/203 |
| JP | 2018020737 | A * | | 2/2018 |
| JP | 2018-122844 | A | | 8/2018 |
| KR | 20100090884 | A * | | 8/2010 |
| KR | 20110029980 | A * | | 3/2011 |
| KR | 20190067425 | A * | | 6/2019 |

\* cited by examiner

[FIG. 1]
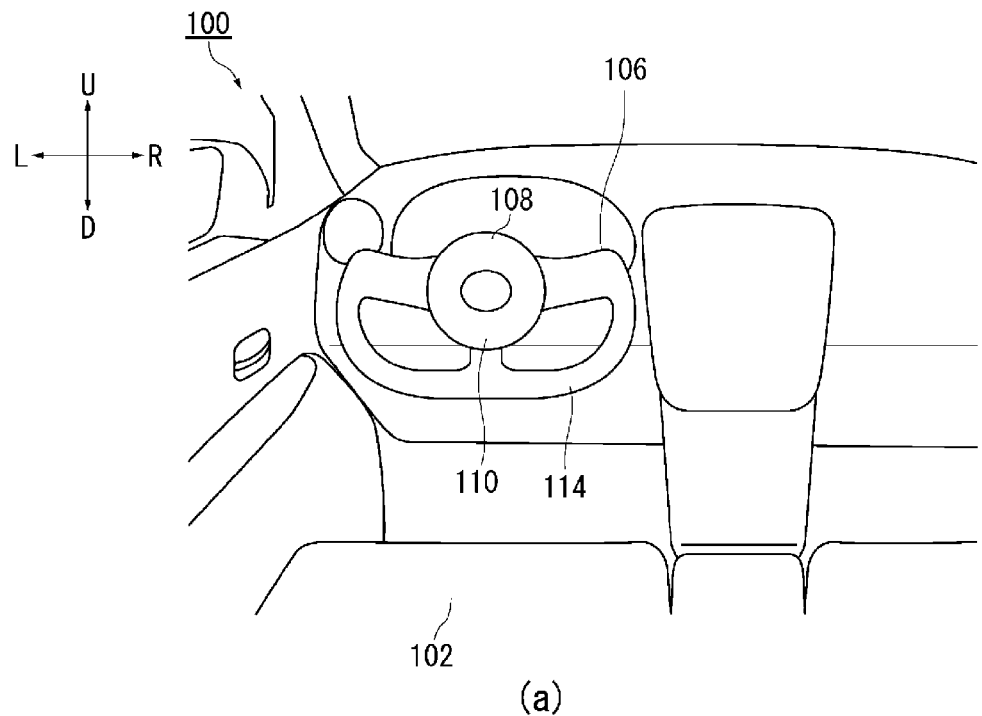
(a)
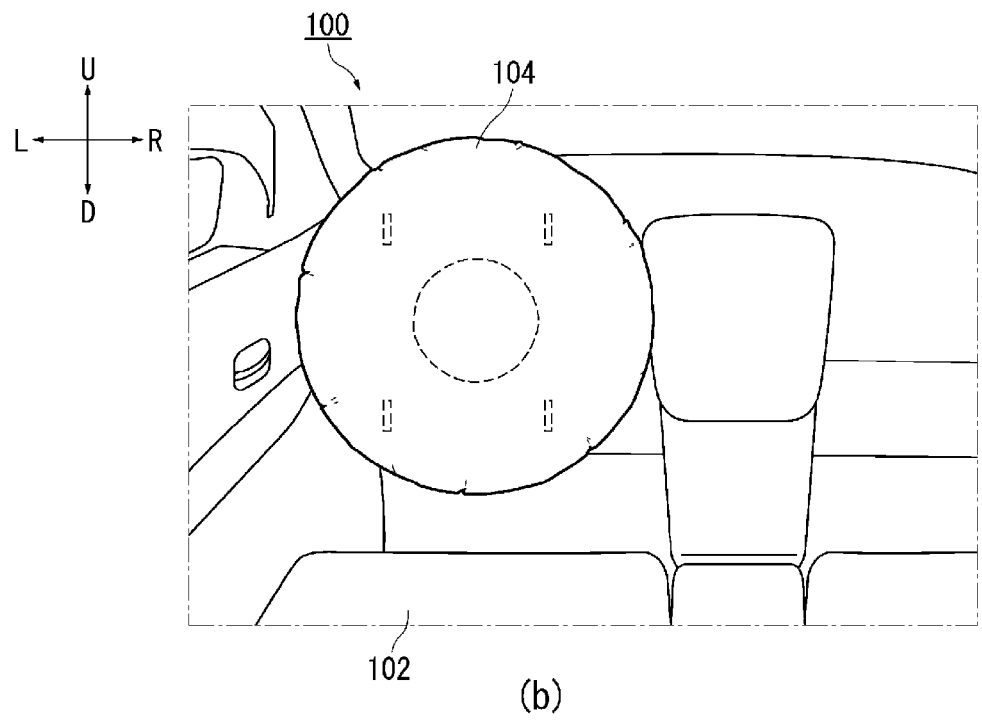
(b)

[FIG. 2]
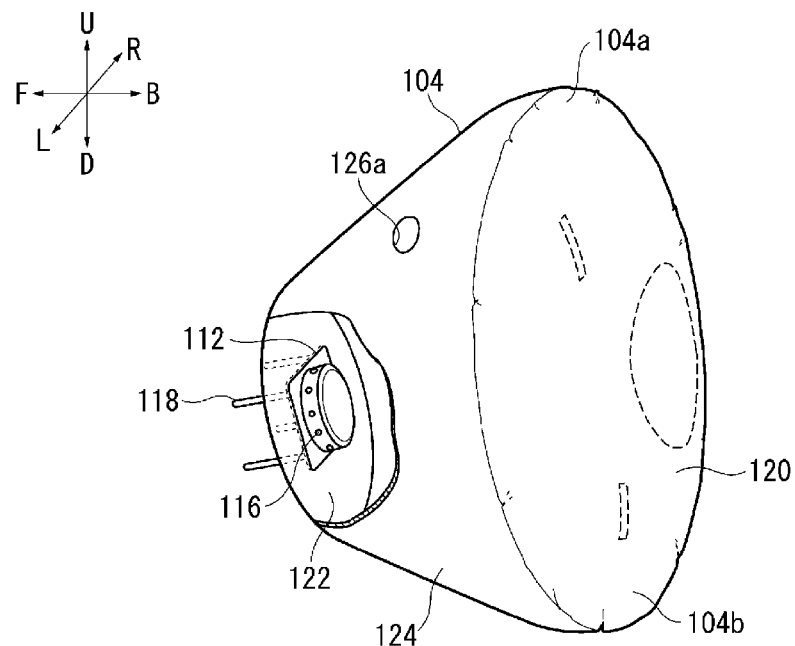
(a)
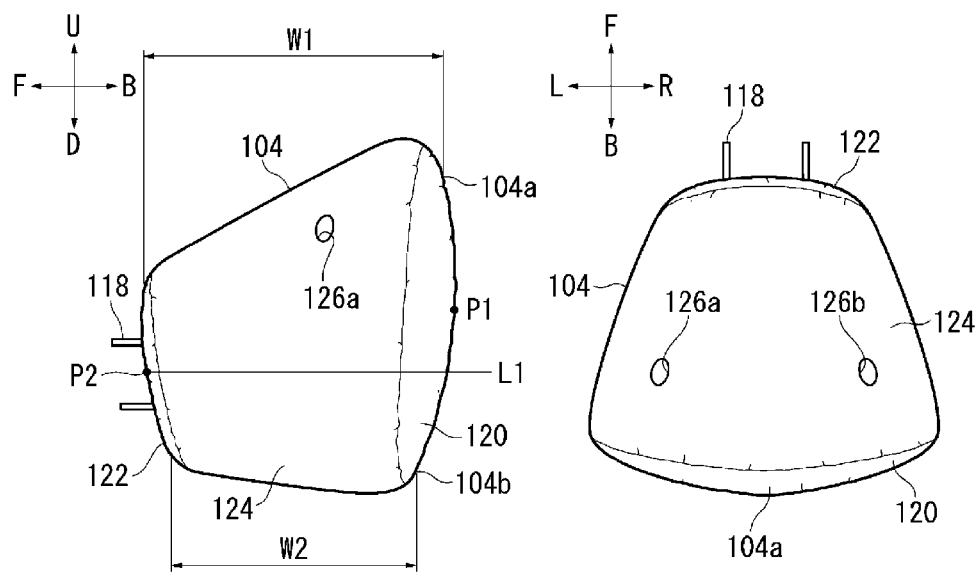
(b)                    (c)

[FIG. 3]
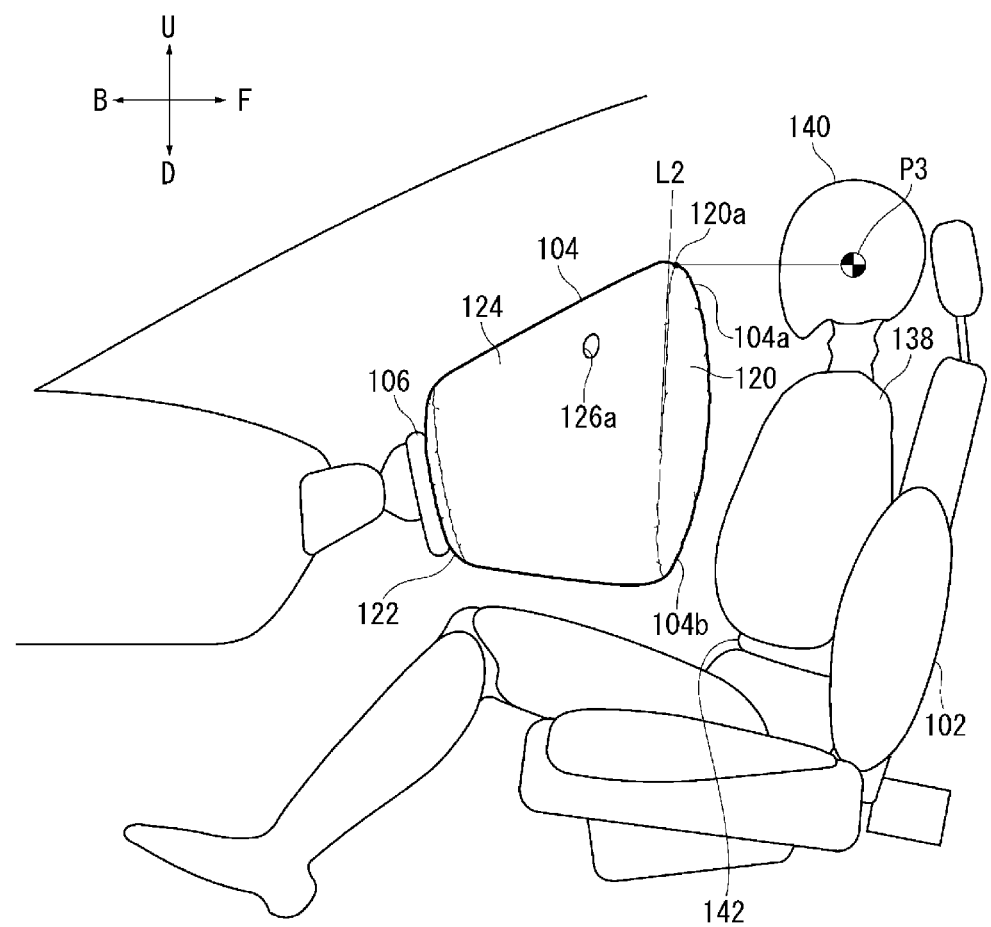

[FIG. 4]
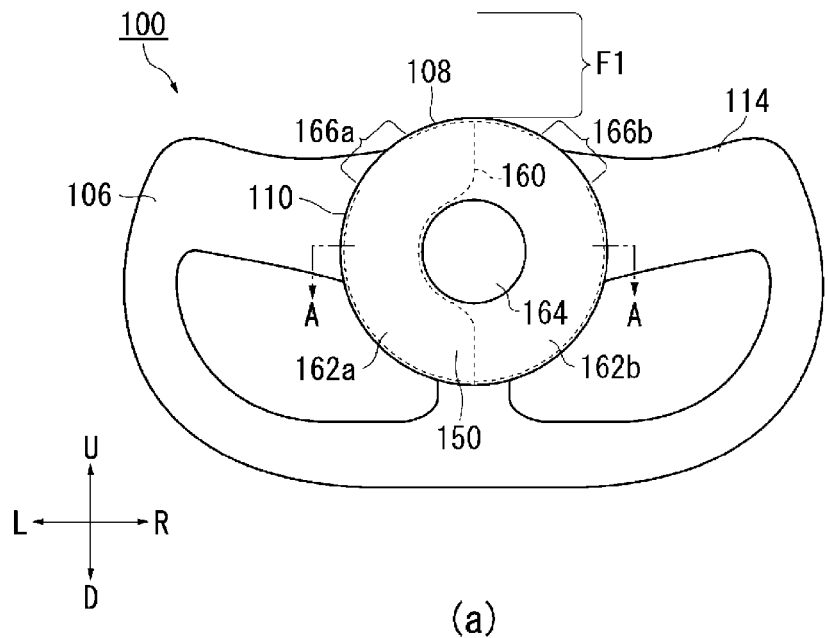
(a)
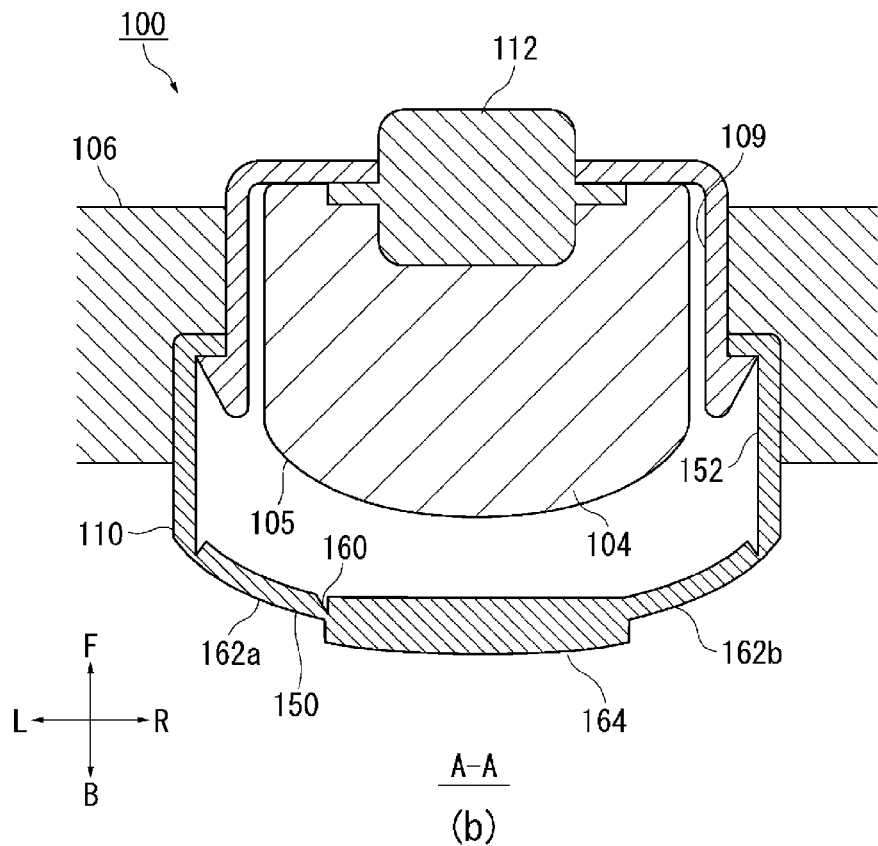
A-A
(b)

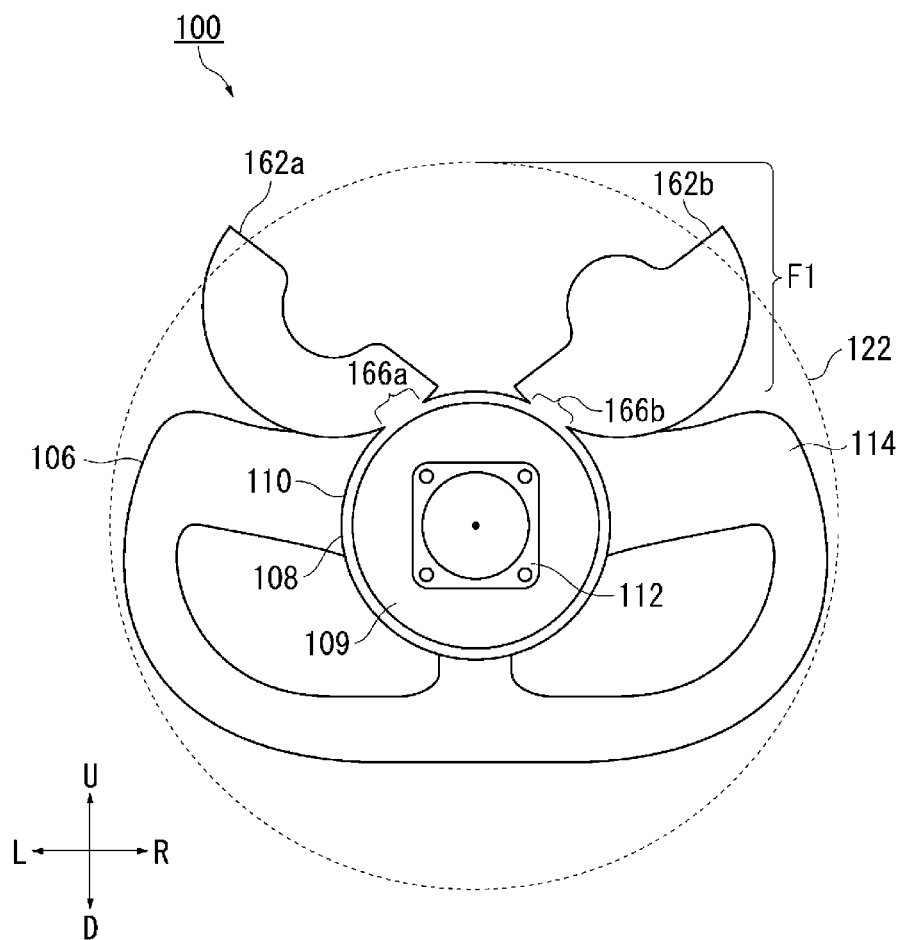
[FIG. 5]

[FIG. 6]
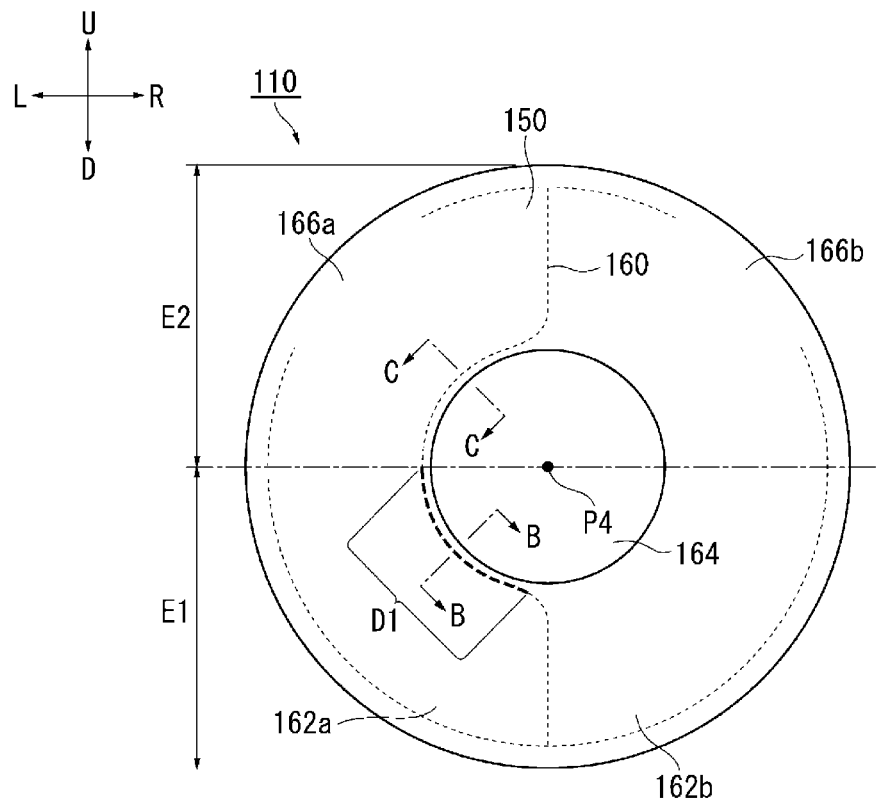
(a)
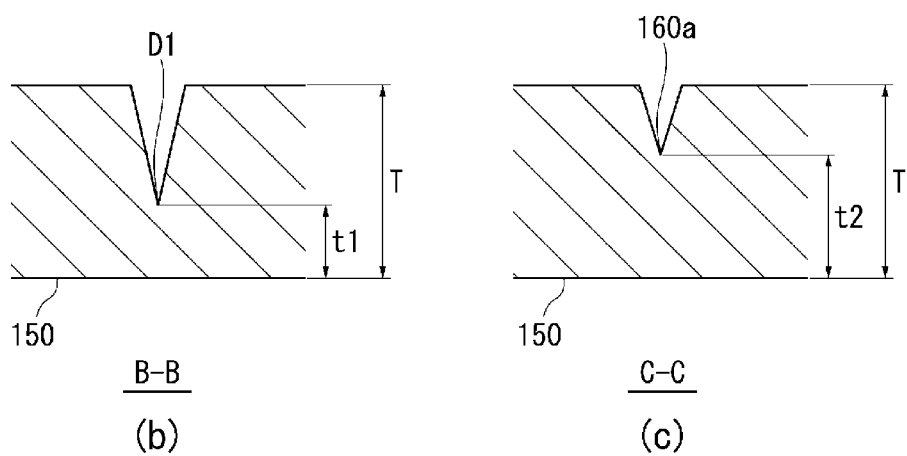
(b) B-B
(c) C-C

[FIG. 7]
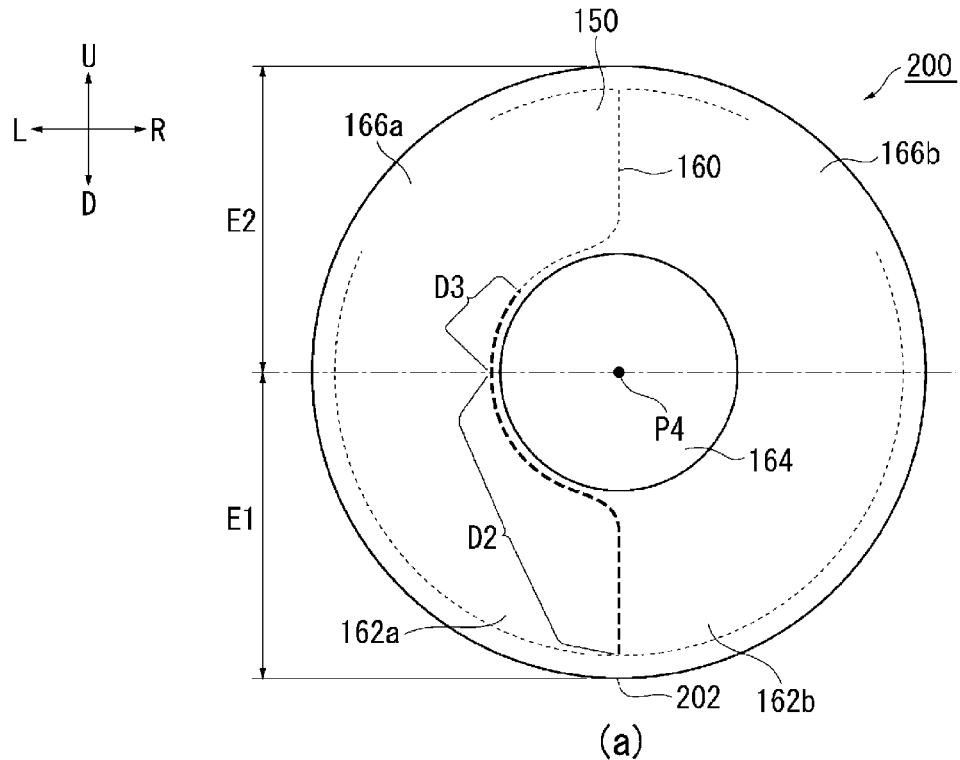
(a)
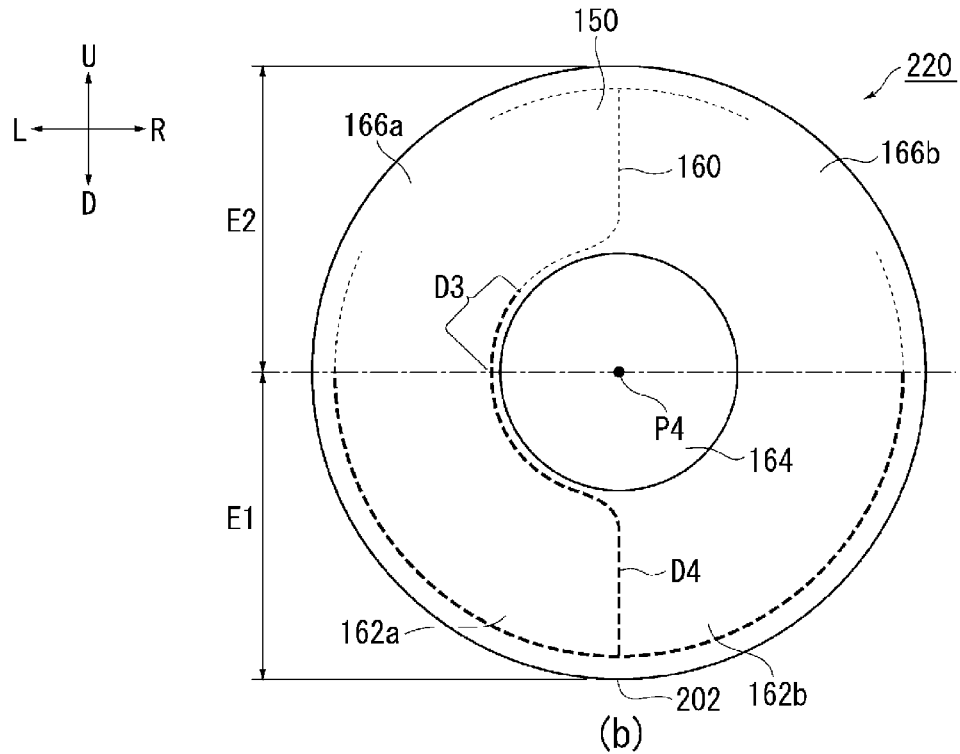
(b)

[FIG. 8]
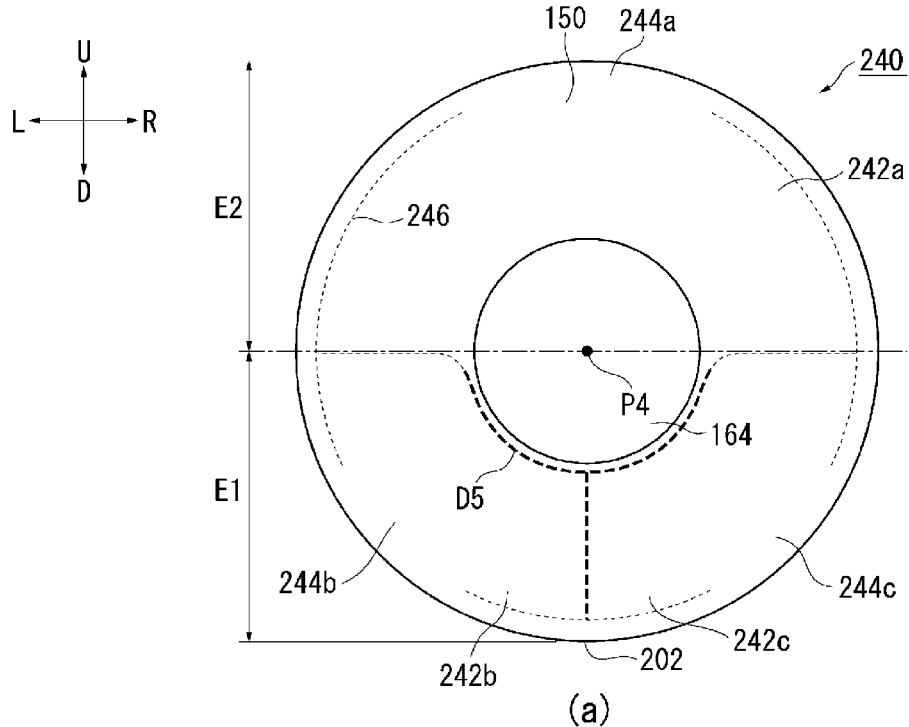
(a)
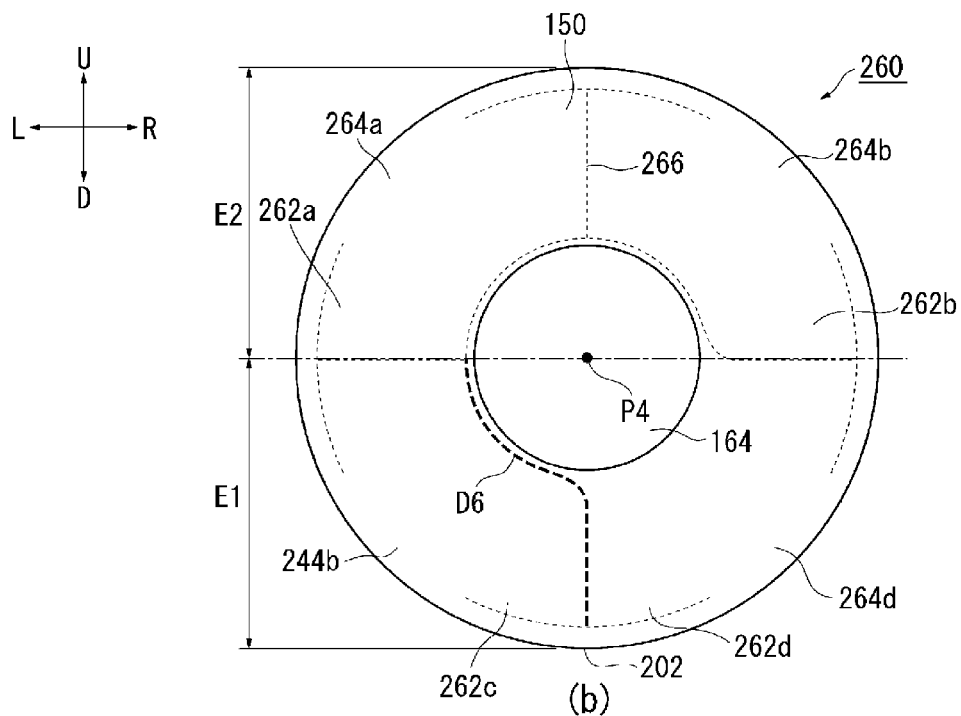
(b)

[FIG. 9]
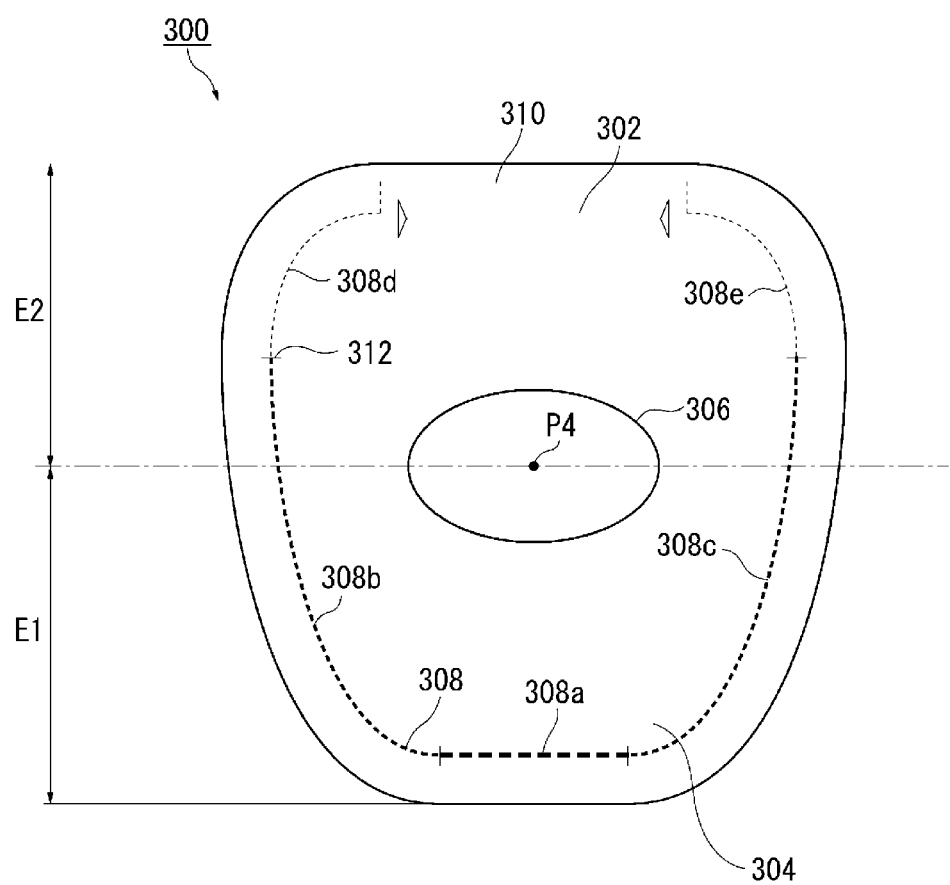

[FIG. 10]
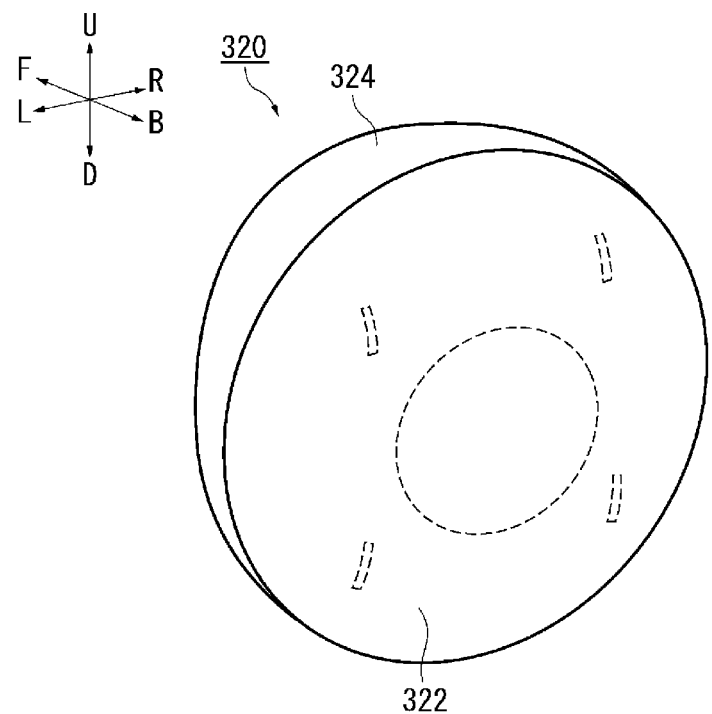
(a)
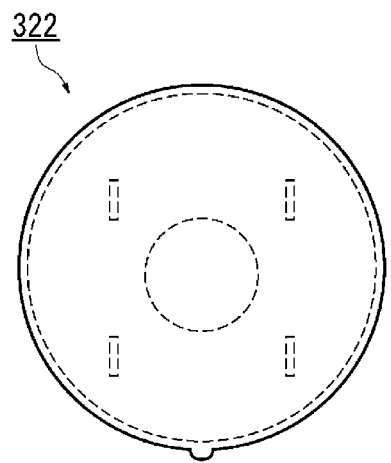
(b)
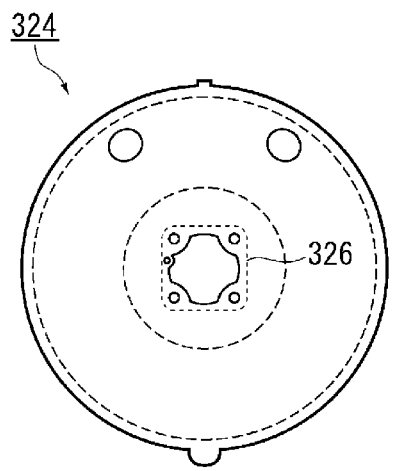
(c)

[FIG. 11]
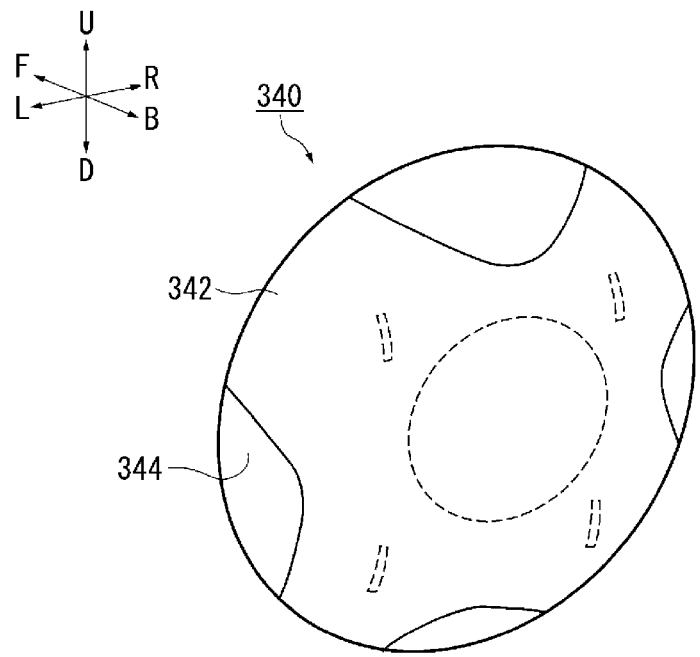
(a)
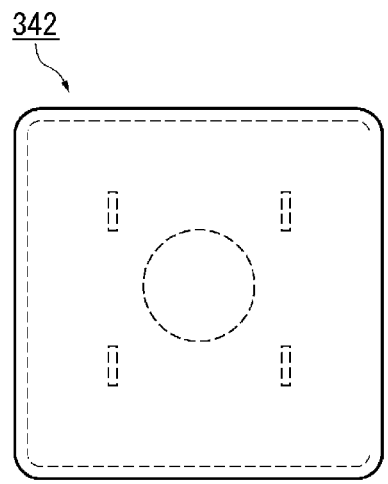
(b)
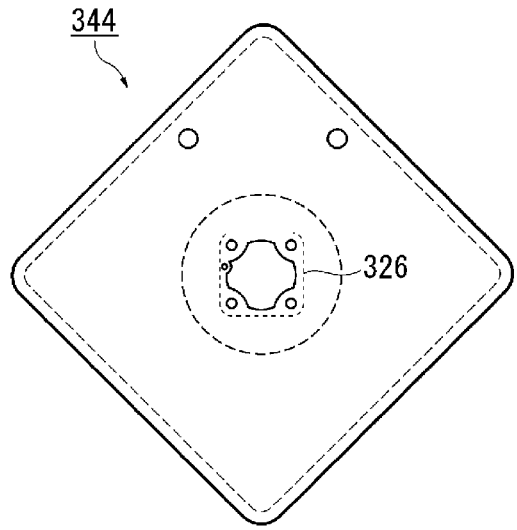
(c)

DRIVER'S SEAT AIRBAG DEVICE

TECHNICAL FIELD

The present invention relates to a driver's seat airbag device for restraining an occupant in an emergency.

BACKGROUND TECHNOLOGY

Currently, nearly all vehicle steering wheels are equipped with a driver's seat airbag device. The airbag cushion of the driver seat airbag apparatus is primarily stored in the central hub of the steering wheel and cleaves a resin cover, and the like at the expansion pressure so as to expand and deploy toward the front of a passenger. Normally, the steering wheel is in a position such that the upper side is inclined toward the front of the vehicle. For example, an airbag 1 of Patent Document 1 is configured such that the front surface 1f (passenger restraining surface) is vertical even when expanded and deployed from an inclined steering wheel by increasing the thickness of the upper portion in the vehicle front-rear direction.

PRIOR ART DOCUMENTS

Patent Documents

Patent Document 1: Japanese Patent Publication 3991739

SUMMARY OF THE INVENTION

As illustrated in FIG. 1(a) of Patent Document 1, the distance between the occupant and the steering wheel is closer on the abdomen side of the occupant and farther on the head side of the occupant. Therefore, in order for the airbag cushion to sufficiently restrain the occupant, expansion and deployment must be as quick as a portion restraining the abdomen of the occupant. However, it is not easy to first expand and deploy a predetermined portion of the airbag cushion without using a complicated mechanism.

Problem to be Solved by the Invention

In view of the foregoing, an object of the present invention is to provide a driver side airbag device capable of first expanding and deploying a predetermined portion of an airbag cushion with a simple configuration.

Means for Solving the Problems

In order to solve the aforementioned problem, a typical configuration of a driver side airbag device according to the present invention is a driver side airbag device, containing: a steering wheel of a vehicle; and an airbag module containing an inflator and an airbag cushion, which is stored in the steering wheel; where the steering wheel contains a housing portion that stores the airbag module, and a cover member that closes the housing portion, the cover member containing a design region facing an occupant side, and a thin-walled portion formed by reducing the thickness of the design region along a predetermined range from an upper portion to a lower portion of the design region and that is cleaved open by expansion pressure of the airbag cushion to open a predetermined range as one or a plurality of cover doors, the thin-walled portion contains a first plate thickness portion having a predetermined thickness and a second plate thickness portion that is thinner than the first plate thickness portion, and the second plate thickness portion is formed at least in the lower portion of the design region.

With the aforementioned configuration, the design region of the cover member starts to cleave open from the lower portion, and thus the airbag cushion also starts to expand and develop first from a lower portion. Therefore, the abdomen of the occupant in close proximity to the steering wheel can be suitably received, and the occupant can be fully restrained.

The second plate thickness portion described above may be formed to reach near a lower end vicinity of the design region. This configuration allows the design region of the cover member to open widely.

The second plate thickness portion described above may be formed from the lower portion of the design region as well as to the upper portion, and may be formed in the lower portion of the design region over a longer range than the upper portion. This configuration also allows the design region of the cover member to be cleaved open from the lower portion.

The ratio of the second plate thickness portion described above may be within a range of 1:3 to 1:20 (upper portion: lower portion). This configuration can also achieve a cover member that cleaves open from the lower portion of the design region.

A predetermined emblem may be provided in the design region described above, and the upper portion and lower portion of the design region may be divided based on the position of the center of gravity of the emblem. This configuration can suitably achieve a cover member that cleaves open from the lower portion of the design region.

The plate thickness of the design region described above may be within a range of 2.0 mm to 3.5 mm, and the thickness of the second plate thickness portion may be within a range of 0.4 mm to 0.7 mm. This configuration can also achieve a cover member that cleaves open from the lower portion of the design region.

The thin-walled portion described above may be formed such that the cover door is two cover doors that open to the left and right. This configuration can also achieve a cover member that cleaves open from the lower portion of the design region.

The thin-walled portion described above may be formed such that the cover door is two cover doors that open diagonally upward to the left and right, as viewed from the center of the design region. This configuration also allows the design region of the cover member to open widely.

The thin-walled portion described above may be formed such that the cover door is three cover doors that open upward and diagonally downward to the left and right, respectively, for a total of three directions, as viewed from the center of the design region. This configuration can also achieve a cover member that cleaves open from the lower portion of the design region.

The thin-walled portion described above may be formed such that the cover door is four cover doors that open diagonally upward and diagonally downward to the left and right, respectively, for a total of four directions, as viewed from the center of the design region. This configuration can also achieve a cover member that cleaves open from the lower portion of the design region.

The thin-walled portion described above may be formed such that the cover door is one cover door that opens upward, as viewed from the center of the design region. This configuration can also achieve a cover member that cleaves open from the lower portion of the design region.

The thin-walled portion described above may be cleaved open from the lower end on the design region, which is a leading end side of the cover door. This configuration allows the airbag cushion to first expand and deploy from the lower portion.

The steering wheel described above further contains a non-circular rim other than a circular ring, and a predetermined space portion in which the rim formed above the cover member is not present; and the cover door opens so as to cover at least a portion of the space portion. According to this configuration, even if a space portion is formed above the cover member by adopting a non-circular rim, a front side of the airbag cushion can be supported by opening the cover door, and thus the airbag cushion can be efficiently expanded and deployed toward the occupant by receiving a reaction force from the cover door.

Effect of the Invention

The present invention can provide a driver side airbag device capable of first expanding and deploying a predetermined portion of an airbag cushion with a simple configuration.

BRIEF DESCRIPTION OF THE DRAWINGS

FIG. 1 is a diagram illustrating the outline of a driver seat airbag apparatus according to an embodiment of the present invention.

FIG. 2 is a diagram illustrating a cushion in FIG. 1(b) from each direction during expansion and deployment.

FIG. 3 is a diagram illustrating the cushion in FIG. 2(b) and a passenger seated in a seat.

FIG. 4 is a diagram illustrating the steering wheel in FIG. 1(a) from each direction.

FIG. 5 is a diagram illustrating a condition when the cover member in FIG. 4(a) is cleaved open.

FIG. 6 is a diagram illustrating the cover member in FIG. 4(a) from each direction.

FIG. 7 is a diagram illustrating first and second modified examples of the cover member in FIG. 6(a).

FIG. 8 is a diagram illustrating third and fourth modified examples of the cover member in FIG. 6(a).

FIG. 9 is a diagram illustrating a fifth modified example of the cover member in FIG. 6(a).

FIG. 10 is a diagram illustrating a first modified example of the cushion in FIG. 2.

FIG. 11 is a diagram illustrating a second modified example of the cushion in FIG. 2.

MODE FOR CARRYING OUT THE INVENTION

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

FIG. 1 is a diagram illustrating the outline of a driver seat airbag apparatus 100 according to an embodiment of the present invention. FIG. 1(a) is a diagram illustrating a vehicle before activation of the driver's seat airbag device 100. Hereinafter, regarding FIG. 1 and other diagrams, a vehicle front-rear direction is illustrated by the symbols F (Front) and B (Back), a vehicle width direction of the vehicle by the symbols L (Left) and R (Right), and a vehicle up-down direction by the symbols U (Up) and D (Down).

The driver's seat airbag device 100 is applied in the present embodiment as the driver airbag for the driver's seat for vehicles with a steering wheel on a left side (front row left side seat 102). Hereinafter, explanations are made assuming the front row left side seat 102, for example, a vehicle outer side in the vehicle width direction (hereinafter, outer vehicle side) refers to a left side of the vehicle, and a vehicle inner side in the vehicle width direction (hereinafter, vehicle inner side) refers to a right side of the vehicle.

The airbag cushion (hereinafter, referred to as cushion 104 (see FIG. 1(b)) of the driver side airbag device is stored in a folded or rolled condition or the like in front of a seating position of the seat 102, inside a central hub 108 of a steering wheel 106. The hub 108 stores the cushion 104 and an inflator 112 that supplies gas (see FIG. 2(a)).

The steering wheel 106 is assumed to be of a configuration in which an operation of the occupant is converted into an electrical signal and transmitted to the wheel, and the shape of a rim 114 is unconventional (non-circular) as compared to a conventional circular shape. The rim 114 is a portion to be gripped by the occupant and receives a rotating operation around the central hub 108. The steering wheel 106 is configured to convert a steering force into an electrical signal, thus eliminating the need to operate the rim 114 to rotate at a large angle. Therefore, the rim 114 does not need to be held by the left or right hand and is shaped to be present only on the left and right and below the hub 108, and a range above the hub 108 is partially omitted.

FIG. 1(b) is a diagram illustrating a vehicle after the cushion 104 of the driver's seat airbag device 100 expands and deploys. The cushion 104 begins to expand while a cover member 110 (see FIG. 1(a)) of the hub 108 is cleaved open by gas from the inflator 112 (see FIG. 2(a)), and expands and deploys into a bag shape in front of the seating position of the seat 102 to restrain the upper body and head of the occupant from moving forward. The cushion 104 has a circular shape as viewed from the seating position side, and is formed by overlaying a plurality of panels that form the surface thereof and then stitching or adhering.

FIG. 2 is a diagram illustrating a cushion 104 in FIG. 1(b) from each direction during expansion and deployment. FIG. 2(a) illustrates the cushion 104 in FIG. 1(b) seen from slightly above the vehicle outer side. In FIG. 2(a), a portion of the panel configuring the cushion 104 is cut out to expose the internal inflator 112.

The cushion 104 in the present embodiment has, as a characteristic shape, a shape close to a truncated cone with the diameter widening from the steering wheel 106 side (see FIG. 1(a)) toward the occupant side (vehicle rear side).

FIG. 2(b) is a diagram illustrating the cushion 104 of FIG. 2(a) from a left side in the vehicle width direction. The cushion 104 is formed from a plurality of panels and contains a front panel 120 positioned on the occupant side, a rear panel 122 positioned on the steering wheel 106 side (see FIG. 1(a)), and a side panel 124 connecting the front panel 120 and the rear panel 122 to form a side portion of the cushion 104.

The front panel 120 is circular and functions as an occupant restraining surface that restrains the occupant during expansion and deployment of the cushion 104. The rear panel 122 is circular and functions as a reaction force surface that receives a reaction force from the steering wheel 106 (see FIG. 1(a)) during expansion and deployment of the cushion 104 (see FIG. 1(b)). The side panel 124 is joined to an entire circumference of an edge of the front panel 120 and an entire circumference of an edge of the rear panel 122.

The cushion 104 has the side panel 124 entirely interposed between the front panel 120 and the rear panel 122, and does not have a location where the rear panel 122 and the front panel 120 are directly stitched together. Furthermore, no locations are present in the cushion 104 in which a total of three panels overlap and are simultaneously stitched together. These configurations enable efficient stitching and manufacturing of the cushion 104 into a bag shape.

The cushion 104 expands and develops in a shape of a truncated cone spreading toward the occupant side, and therefore, the rear panel 122 has a narrower area than the front panel 120. A portion of the inflator 112 is inserted in the center of the rear panel 122, while a stud bolt 118 provided in the inflator 112 penetrates and is secured to the inside of the hub 108.

The inflator 112 is a device for supplying gas, and in the present embodiment, a disk type is used. The inflator 112, where a portion thereof formed with a gas discharge port 116 is inserted into the cushion 104 through a rear panel 122, is activated based on an impact detection signal transmitted from a sensor (not shown) to supply gas to the cushion 104. The inflator 112 is provided with a plurality of stud bolts 118. The stud bolt 118 passes through the rear panel 122 of the cushion 104 in order to fasten to the inside of the hub 108 of the steering wheel 106 (see FIG. 1(a)) described above. The cushion 104 is also secured to the interior of the hub 108 by the fastening stud bolts 118.

Note that examples of currently prevailing inflators include: types filled with a gas generating agent and that burns the agent to generate a gas; types filled with a compressed gas and supplies the gas without generating heat; hybrid types that utilize both a combustion gas and a compressed gas; and the like. Any of these types of inflators can be used as the inflator 112.

The expanded and deployed cushion 104 is shaped along a truncated cone, but is generally slightly inclined. Specifically, the shape is inclined such that a center P1 of the front panel 120 in a height direction is positioned above an imaginary line L1 horizontally extended from a center P2 of the rear panel 122 in the height direction. When the cushion 104 is expanded and deployed, the front panel 120 is arranged to extend substantially vertically, while the rear panel 122 is arranged so that the upper portion thereof is inclined to collapse to the vehicle front side (left side in FIG. 2(b)). As a result, in the vehicle front-rear direction, the width W1 of an upper portion 104a of the expanded and deployed cushion 104 is thicker than the width W2 of a lower portion 104b of the cushion 104.

FIG. 2(c) is a diagram illustrating the cushion 104 of FIG. 2(a) from above. The cushion 104 is in the shape of an essentially symmetrical truncated cone when viewed from above. Two first vent holes 126a, 126b that discharge gas are open in the side panel 124. Vent holes 126a, 126b are provided on the upper side of the side panel 124 at two locations on the left and right sides. The vent holes 126a, 126b in these positions allow gas to be vented in a direction where the occupant is not present during expansion and deployment of the cushion 104.

FIG. 3 is a diagram illustrating the cushion 104 in FIG. 2(b) and a passenger 138 seated in a seat 102. FIG. 3 illustrates the cushion 104 and the passenger 138 as viewed from the left side in the vehicle width direction.

In the present example, as described with reference to FIG. 2(b), the upper portion 104a of the expanded and deployed cushion 104 is configured to be thicker in the vehicle front-rear direction than the lower portion 104b of the cushion 104. In particular, the expanded and deployed cushion 104 is installed in an orientation whereas a boundary L2 between the side panel 124 and the front panel 120 extends upwardly when viewed from the vehicle width direction. In an emergency, the occupant 138 attempting to move forward in the vehicle will make contact at an early stage from the upper portion 104a of the cushion 104. The upper portion 104a of the cushion 104 absorbs a load from the head 140 of the occupant 138 with a thickness thereof.

As described with reference to FIG. 2(b), the width W2 in the vehicle front-rear direction of the lower portion 104b of the cushion 104 is slightly smaller than the width W1 of the upper portion 104a. In a general vehicle, a steering wheel is inclined at an angle of approximately 20° to 25° to the vehicle front side, and a space between the steering wheel and the occupant 138 narrows in the vehicle front-rear direction toward a lower abdomen 142 side. With the cushion 104 of the present example, the width in the vehicle front-rear direction decreases as the cushion moves toward the lower portion 104b, and therefore, the lower portion 104b easily enters the narrow space between the steering wheel 106 and the abdomen 142.

According to the configuration described above, the lower portion 104b of the cushion 104 is sandwiched by the steering wheel 106 and the abdomen 142, and thus the shape of the cushion 104 is less likely to collapse. Furthermore, the restraining performance of the upper portion 104a of the cushion 104 with regard to the head 140 of the occupant 138 is also improved as a result. In particular, the stabilized shape of the cushion 104 can prevent movement of the head 140 of the passenger 138, such as forward bending, backward bending, or the like of the head 140, which are prone to high injury values.

As described above, the cushion 104 of the present example is configured with a wide front panel 120 area, which serves as an occupant restraining surface, and a narrow rear panel 122 area, which receives a reaction force from the steering wheel 106. The steering wheel 106 has a narrower contact range with the cushion than a conventional circular steering wheel. The rear panel 122 can be set to a dimension based on the steering wheel 106 so as to omit a portion that does not contact the steering wheel 106. This enables reducing the amount of material used to construct the rear panel 122 and to reduce the gas capacity of the cushion 104, thereby contributing to cost reduction.

The cushion 104 of the present embodiment can be set to have a gas capacity in the range of 50 to 60 liters by employing a small diameter rear panel 122. This reduces the number of panels configuring the cushion 104. Therefore, the cushion 104 can be folded or the like into a smaller storing form, and thus can be easily installed on a steering wheel 106 with limited storing space.

A gas capacity within the aforementioned range eliminates the need for a high output inflator and an inflator 112 (see FIG. 2(a)), which is as small and inexpensive as possible, can be used. For example, the inflator 112 can use an output in a range of 200 kPa to 230 kPa. An inflator with this output is small and inexpensive, making it beneficial in terms of weight reduction and cost reduction. Reducing the gas capacity of the cushion 104 shortens the time required for the expansion of the cushion 104 to be completed, which leads to the improvement of the occupant restraining performance.

In the present embodiment, an upper end 120a of the front panel 120 of the expanded and deployed cushion 104 is set to be located at a height within a range of ±100 mm of the center of gravity of the head of an adult male. For example, the occupant 138 in FIG. 3 is assumed to be a test dummy AM50 (50th percentile male equivalent, 175 cm tall and 78 kg in weight) that mimics a physique that conforms to 50th percentile, or the average U.S. adult male. The upper end 120a of the front panel 120 of the cushion 104 is set to be located at a height within a range of ±100 mm of a center of gravity P3 of the head of this AM50.

The head 140 of the occupant 138, when in contact with the front panel 120 from the chin, forehead, or the like, may cause a rotational movement such as forward retroflexing or backward retroflexing. As described above, forward and backward bending of the head 140 are likely to cause high injury values due to the structure of the human body. The cushion 104 of the present embodiment contacts the front panel 120 from the position of the center of gravity P3 of the head to restrain the head 140 without excess movement, thereby enabling the injury value to be reduced.

FIG. 4 is a diagram illustrating the steering wheel 106 in FIG. 1(a) from each direction. FIG. 4(a) is an enlarged view of the steering wheel 106 in FIG. 1(a). The occupant 138 side of the cover member 110 of the hub 108 is a design region 150 with a predetermined decoration, and an emblem 164 corresponding to the vehicle is arranged in a center thereof. The cover member 110 is made of resin and is configured to cleave open when the cushion 104 expands and deploys to form two cover doors 162a, 162b.

FIG. 4(b) is a cross-sectional view along A-A of the hub 108 of the steering wheel 106 in FIG. 4(a). As illustrated in FIG. 4(b), the cushion 104, along with the inflator 112, configures an airbag module 105 and is stored in a housing portion 109.

The hub 108 of the steering wheel 106 contains: the housing portion 109 that stores the airbag module 105; and the cover member 110 that closes the housing portion 109. The cover member 110 contains the design region 150 that faces the occupant side and a wall portion 152 connected to the housing portion 109.

A thin-walled portion 160 that induces cleaving is formed into a groove shape on an inner side surface of the hub 108 in the design region 150 of the cover member 110. The thin-walled portion 160 is formed by reducing the plate thickness of the design region 150 and defines the shape of the cover doors 162a, 162b.

As illustrated in FIG. 4(a), the cover member 110 has a configuration where two cover doors 162a, 162b are formed. The cover doors 162a, 162b are formed by bisecting a range from the upper portion to the lower portion of the design region 150 of the cover member 110 into left and right sides, such that the emblem 164 is included on the cover door 162b on the right side. The cover member 110 is formed with hinges 166a, 166b that connect a body of the cover member 110 to the cover doors 162a, 162a such that the cover doors 162a, 162b do not fly away.

FIG. 5 is a diagram illustrating a condition where the cover member 110 in FIG. 4(a) is opened. FIG. 5 illustrates the vicinity of the hub 108 of the steering wheel 106 through the rear panel 122 of the cushion 104. The cover member 110 of the present embodiment is made of resin, and in a normal temperature environment (approximately 23° C. as an example), the expansion pressure of the cushion 104 causes a cleaving starting at the thin-walled portion 160 (see FIG. 4(a)). Then, the cover member 110 opens in such that the two cover doors 162a, 162b open the cover member 110 widely, diagonally upward to the left and right as viewed from the center of the design region 150.

The hinges 166a, 166b are formed at respective locations separated diagonally upward to the left and right as viewed from the center of the hub 108 as regions which do not cleave open between end points of the thin-walled portion 160.

Opening the cover doors 162a and 162b diagonally upward to the left and right has an advantage from the perspective of safety for the occupant 138 (see FIG. 3). During vehicle travel, if the occupant 138 is in a non-normal seating position (commonly known as out-of-position), such as if the occupant 138 leans out of the normal seating position of the seat 102 or the like, the jaw tip of the occupant 138 may be in close proximity to the cover member 110. In particular, a small adult woman or the like is more likely to have a jaw tip in close proximity to the cover member 110 while driving. In this state, if the cover door is configured to open directly upward from the cover member 110, the cover door may conceivably touch the jaw tip of the occupant. Therefore, the cover doors 162a, 162b are configured to open diagonally upwardly to the left and right of each other as viewed from the center of the design region 150 of the cover member 110, thereby preventing the jaw tip of the occupant from being pushed directly upward. This configuration prevents vertical rotation of the head, which tends to increase the injury level of the occupant, and thus a safer airbag device is achieved.

FIG. 4(a) is again referred to. By employing a non-circular rim 114 other than the aforementioned circular rim in the steering wheel 106 of the present embodiment, a space portion F1 in which the rim 114 is not present is formed above the cover member 110. At this time, "upward as viewed from the cover member 110" refers to the direction of the head 140 as viewed from the occupant 138 (see FIG. 3) in a posture squarely facing the steering wheel 106. Therefore, "downward as viewed from the cover member 110" refers to the direction of a lower limb portion as viewed from the occupant 138 (see FIG. 3) in a posture squarely facing the steering wheel 106.

As illustrated in FIG. 5, the cover doors 162a, 162b of the present embodiment are configured to open so as to cover at least a portion of the space portion F1. According to this configuration, even if a space portion F1 is formed above the cover member 110 by adopting a non-circular rim 114, the rear panel 122 on the front side of the cushion 104 (see FIG. 3) can be supported by opening the cover doors 162a, 162b, and thus the cushion 104 can be efficiently expanded and deployed toward the occupant 138 by receiving a reaction force from the cover doors 162a, 162b.

FIG. 6 is a diagram illustrating the cover member 110 in FIG. 4(a) from each direction. FIG. 6(a) is an enlarged view of the design region 150 of the cover member 110 in FIG. 4(a). In the present embodiment, the thin-walled portion 160 is devised in order to adjust the manner in which the design region 150 of the cover member 110 is cleaved open.

In the following description, the directions of up, down, left and right with regard to the design region 150 of the cover member 110 are assumed to be directions viewed from a position of a center of gravity P4 of the emblem 164 provided in the center of the design region 150. The emblem 164 is assumed to be circular as an example. The center of gravity P4 of the emblem 164 is obtained by dividing the cross-sectional primary moment of the emblem 164 by the area, assuming that the emblem 164 is viewed as a flat figure (center of gravity=cross-sectional primary moment/area).

The center of gravity P4 is approximately aligned with the center of the emblem 164 and the design region 150. The center of gravity P4 of the emblem 164 is a position on the design region 150 where the expansion pressure of the cushion 104 is evenly applied. Note that as illustrated in FIG. 3, the steering wheel 106 may be installed with an upper portion side tilted toward the front of the vehicle. An up-down direction of the design region 150 illustrated in FIG. 6(a) and the like is a direction connecting 12 o'clock and 6 o'clock when the steering wheel 106 is compared to a clock, and may not actually coincide with a vertical direction. Furthermore, left-right directions of the design region 150 are 3 o'clock or 9 o'clock directions when the steering wheel 106 is compared to a clock.

As described with reference to FIG. 3, in order to fully restrain the occupant 138 utilizing the cushion 104, the lower portion 104b of the cushion must be rapidly expanded and deployed in the narrow space between the abdomen 142 of the occupant 138 and the steering wheel 106. In order to achieve this, in the present embodiment, the cover member 110 (see FIG. 6(a)) has a structure in which a lower portion region E1 below the center of gravity P4 of the design region 150 begins to cleave open before an upper portion region E2 thereabove.

In the present embodiment, in order to cleave open the design region 150 from the lower portion region E1 first, a range of the lower portion region E1 is set to be easier to cleave open than the upper portion region E2 of the thin-walled portion 160. Specifically, the thin-walled portion 160 is provided by shaving the plate thickness of the design region 150, and a location where the plate thickness is thinner than the thin-walled portion 160 is formed in the lower portion region E1 instead of the upper portion region E2. For example, a second plate thickness portion D1 (thick dashed line) is formed in the lower portion region E1 as a location of the thin-walled portion 160 where the plate thickness is thinner than the first plate thickness portion 160a (see FIG. 6(c)) with a standard plate thickness.

FIG. 6(b) is a cross-sectional view along B-B through the second plate thickness portion D1 of the lower portion region E1 of the design region 150 in FIG. 6(a). In the design region 150, for example, the original plate thickness is set within a range of 2.0 mm to 3.5 mm. In the second plate thickness portion D1, the plate thickness is within a range of 0.4 mm to 0.7 mm.

FIG. 6(c) is a cross-sectional view along C-C through the thin-walled portion 160 of the upper portion region E2 of the design region 150 in FIG. 6(a). A plate thickness t2 at a location on the design region 150 where a standard portion (first plate thickness portion 160a) of the thin-walled portion 160 is formed is set to be 1.5 mm or more for example.

According to the aforementioned configuration, the thin-walled portion 160 induces cleaving in the lower portion region E1 before the upper portion region E2 of the design region 150 due to the second plate thickness portion D1 being formed in the lower portion region E1, and the cleaving rate is also faster within a range of the lower portion region E1 than in the upper portion region E2. Therefore, the cover doors 162a, 162b in FIG. 6(a) begin to open from a lower portion, and the cushion 104 (see FIG. 3) also begins to expand and deploy first from the lower portion 104b. Therefore, the cushion 104 can also suitably receive the abdomen 142 of the occupant 138 in close proximity to the steering wheel 106, and thus the occupant 138 can be fully restrained.

As described above, according to the present embodiment, the driver side airbag device 100 capable of first expanding and deploying a predetermined portion of the cushion 104 to fully restrain the occupant 138 (see FIG. 3) can be achieved in a simple configuration in which the thin-walled portion 160 is configured.

Note that the second plate thickness portion D1 (see FIG. 6(a)) may be formed entirely in the lower portion region E1, or may be configured with a portion formed in the lower portion region E1 and another portion formed in the upper portion region E2. Even in this configuration, for example, by providing a second plate thickness portion D1 longer in the lower portion region E1 than in the upper portion region E2, the design region 150 can first cleave open from the lower portion region E1.

Furthermore, although the steering wheel 106 has a shape in which a portion on the upper side of the hub 108 is omitted, technical ideas applied to the aforementioned cover member 110 can be effectively implemented in a conventional circular steering wheel.

Modified Example

Modified examples of each Western style configuration described above will be described below. In each of FIGS. 7 to 9, the same components as those already described are omitted from the description by labeling with the same sign. Furthermore, in the following description, the same names as the components described above shall have the same functions unless otherwise indicated, even when labeled with a different symbol.

FIG. 7 is a diagram illustrating a first modified example (cover member 200) and a second modified example (cover member 220) of the cover member in FIG. 6(a). FIG. 7(a) is a diagram illustrating a cover member 200 of the first modified example. In the present modified example, a portion and not all of the second plate thickness portion is formed in the lower portion region E2. Specifically, in the cover member 200, second plate thickness portions D2, D3 of the thin-walled portion 160 are also formed from the lower portion region E1 to the upper portion region E2 of the design region 150. However, the second plate thickness portion D2 of the lower portion region E1 is formed over a longer range than the second plate thickness portion D3 of the upper portion region E2. For example, the second plate thickness portion D2 is formed to be approximately three times longer than the second plate thickness portion D3 (D3:D2=1:3).

Even with the configuration of the cover member 200, the thin-walled portion 160 induces cleaving in the lower portion region E1 before the upper portion region E2, and the cleaving rate is also faster within the range of the lower portion region E1 than in the upper portion region E2. Therefore, the cover member 200 also allows the cushion 104 (see FIG. 3) to expand and deploy first from the lower portion 104b.

Furthermore, the second plate thickness portion D2 is formed to reach the vicinity of a lower end 202 of the lower portion region E1 in the design region 150. This configuration enables the design region 150 to open widely and smoothly in the present modified example.

FIG. 7(b) is a diagram illustrating a cover member 220 of the second modified example. In the cover member 220, a range of the second plate thickness portion D4 in the lower portion region E1 is even longer. For example, the second plate thickness portion D4 of the upper portion region E2 is formed to be approximately 20 times longer than the second plate thickness portion D3 (D3:D4=1:20).

The configuration of the cover member 220 also allows the second plate thickness portion D4 to induce cleaving in the lower portion region E1 before the upper portion region E2, and to accelerate the cleaving rate of the lower portion region E1. Therefore, the cover member 220 also allows the cushion 104 (see FIG. 3) to expand and deploy first from the lower portion 104b. Furthermore, the second plate thickness portion D4 is formed to reach the vicinity of a lower end 202 of the lower portion region E1. Therefore, the design region 150 can open widely and smoothly even in the present modified example.

FIG. 8 is a diagram illustrating a third modified example (cover member 240) and a fourth modified example (cover member 260) of the cover member in FIG. 6(a). FIG. 8(a) is a diagram illustrating a cover member 240 of the third modified example. In the cover member 240, a total of three cover doors 242a to 242c are formed. Of these, the cover door 242a is formed within an upper half of the upper portion region E2, including the emblem 164, and opens upward as viewed from the center of the design region 150 by a hinge 244a. The cover doors 242b, 242c are formed so as to bisect the lower portion region E1 to left and right sides, and open diagonally downward to the left and right, respectively, by hinges 244b, 244c.

The aforementioned cover doors 242a to 242c are defined by the thin-walled portion 246. Furthermore, in the cover member 240, a second plate thickness portion D5, which is a thinner location in the thin-walled portion 246, is formed within a range of the lower portion region E1. For example, the second plate thickness portion D5 is formed in the lower portion region E1 along a lower side of the emblem 164 and boundary portions of the cover doors 242b, 242c, extending to the vicinity of the lower end 202 of the lower portion region E1. Therefore, the cover member 240 is also capable of preferentially cleaving open the cover doors 242b, 242c on the lower portion, rather than the cover door 242a on the upper portion, to allow the cushion 104 (see FIG. 3) to expand and deploy first from the lower portion 104b.

FIG. 8(b) is a diagram illustrating a cover member 260 of the fourth modified example. In the cover member 260, a total of four cover doors 262a to 262d are formed. Of these, the cover doors 262a, 262b are formed so as to bisect the upper portion region E2 to left and right sides, and open diagonally downward to the left and right, respectively, by hinges 264a, 264b. The cover doors 262c, 262d are formed so as to bisect the lower portion region E1 to left and right sides, and open diagonally downward to the left and right, respectively, by hinges 264c, 264d. At this time, the emblem 164 is included on the cover door 262d.

The aforementioned cover doors 262a to 262d are defined by the thin-walled portion 266. Furthermore, in the cover member 260, a second plate thickness portion D6, which is a thinner location in the thin-walled portion 266, is formed within a range of the lower portion region E1. For example, the second plate thickness portion D6 is formed in the lower portion region E1 along boundary portions of the cover doors 262c, 262d, extending to the vicinity of the lower end 202 of the lower portion region E1. Therefore, the cover member 260 is also capable of preferentially cleaving open the cover doors 262c, 262d on the lower portion, rather than the cover door 262a, 262b on the upper portion, to allow the cushion 104 (see FIG. 3) to expand and deploy first from the lower portion 104b.

Even in the aforementioned cover members 240, 260, similar to the cover members 200, 220 in FIG. 7, the lower portion region E1 can be configured to be cleaved open first by providing a longer second plate thickness portion in the lower portion region E1 while also providing a predetermined second plate thickness portion in the upper portion region E2.

In each of the aforementioned cover members, a second plate thickness portion having a thinner plate thickness of the thin-walled portion is provided in the lower portion region E1. The second plate thickness portion can be formed by machining a groove deeper than the first plate thickness portion, as can be seen, for example, from the second plate thickness portion D1 in FIG. 6(b) and the first plate thickness portion 160a in FIG. 6(c). However, even if, for example, the original thickness of the lower portion region E1 is set to be thinner than that of the upper portion region E2, and a groove of constant depth is formed between the lower portion region E1 and the upper portion region E2, the thickness of the plate at the location where the groove is formed is thinner in the lower portion region E1 than in the upper portion region E2. Therefore, the second plate thickness portion can be formed in the lower portion region E1.

FIG. 9 is a diagram illustrating a fifth modified example (cover member 300) of the cover member 110 in FIG. 6(a). The cover member 300 is configured such that a single wide cover door 304 is formed over a large portion of an upper portion region E2 to a lower portion region E1 of a design region 302.

The design region 302 of the cover member 300 has a design similar to an inverted trapezoid with a round shape, and an elliptical emblem 306 is provided in the center. The center of gravity P4 of the emblem 306 is approximately aligned with the center of the design region 302. A thin-walled portion 308 is formed along an edge of the design region 302. In a region above the emblem 306 in the design region 302, the thin-walled portion 308 is interrupted and a hinge 310 of the cover door 304 is formed.

In the cover member 300, a second plate thickness portion 308a having a thinner plate thickness of the thin-walled portion 308 is also formed in the lower portion region E1 in order to cause cleaving from the lower portion region E1 in the design region 302. The second plate thickness portion 308a is formed below the emblem 306 and in a lower portion at the center on left and right sides of the design region 302. The second plate thickness portion 308a has a plate thickness of 0.4 mm to 0.7 mm where, for example, the plate thickness of a general portion of the design region 302 is within a range of 2.0 mm to 3.5 mm.

The thin-walled portion 308 is gradually shallower from the second plate thickness portion 308a toward the hinge 310, which is a base of the cover door 304, such that the cover door 304 opens smoothly from a location of the second plate thickness portion 308a serving as a tip end. For example, in the thin-walled portion 308, intermediate portions 308b, 308c having a plate thickness of 1.00 0 mm to 1.00 2 mm are formed from the second plate thickness portion 308a to a midway point 312 slightly above the emblem 306. Furthermore, first plate thickness portions 308d, 308e having plate thicknesses within a range of from 1.2 mm to another general portion are formed from the midway point 312 to an end point in the vicinity of the hinge 310. At this time, at an end point of the thin-walled portion 308, the plate thickness can be partially increased or a rib or the like can be provided as a stopper to stop cleaving.

With the aforementioned configuration, the thin-walled portion 308 cleaves open from a location (second plate thickness portion 308a) serving as lower end on the design region 302. The second plate thickness portion 308a is also a location serving as a tip end side of the cover door 304 and is formed at a central lower portion of the design region 302.

Cleaving from this location allows the cover door 304 to open smoothly upward. This configuration also can suitably achieve the cover member 300 that cleaves open from the lower portion of the design region 302, and allows the cushion 104 (see FIG. 3) to expand and deploy first from the lower portion 104b.

FIG. 10 is a diagram illustrating a first modified example (cushion 320) of the cushion 104 in FIG. 2. FIG. 10(a) illustrates a cushion 320, corresponding to FIG. 2(a). The cushion 320 has a different configuration than the conical trapezoid shape cushion 104 in FIG. 2(a) from the perspective that the shape is flat and spherical.

The cushion 320 is configured of two panel members: a front panel 322 and a rear panel 324. In the cushion 320, the side panel 124 in FIG. 2(a) is omitted.

FIG. 10(b) is a diagram illustrating the front panel 322 in FIG. 10(a) spread out on a plane. The front panel 322 has a circular shape and functions as a restraining surface that restrains the occupant when the cushion 320 is expanded and deployed.

FIG. 10(c) is a diagram illustrating the rear panel 324 in FIG. 10(a) spread out on a plane. The rear panel 324 is circular and is set with the same dimensions as the front panel 322 (see FIG. 10(b)). The rear panel 324 functions as a reaction force surface that receives a reaction force from the steering wheel 106 (see FIG. 3) when the cushion 320 is expanded and deployed. A securing region 326 is formed on the center of the rear panel 324 where the inflator 112 (see FIG. 2(a)) is inserted and secured inside the steering wheel 106.

The cushion 320 in FIG. 10(a) is formed by joining an edge of the front panel 322 to an edge of the rear panel 324. The cushion 320 of these configurations can also be used in combination with each of the aforementioned cover members similar to the cushion 320 in FIG. 3. Thereby, the cushion 320 can also start to expand and deploy first from the lower portion to suitably receive the abdomen 142 of the occupant 138 in close proximity to the steering wheel 106 to fully restrain the occupant 138.

FIG. 11 is a diagram illustrating a second modified example (cushion 340) of the cushion 104 in FIG. 2. FIG. 11(a) illustrates a cushion 340, corresponding to FIG. 2(a). Similar to the cushion 320 in FIG. 10(a), the cushion 340 is also configured of two panel members, a front panel 342 and a rear panel 344, which expand and deploy into a flat spherical shape.

FIG. 11(b) is a diagram illustrating the front panel 342 in FIG. 11(a) spread out on a plane. The front panel 342 is formed in a shape similar to a square and functions as a restraining surface to restrain the occupant when the cushion 340 is expanded and deployed. FIG. 11(c) is a diagram illustrating the rear panel 344 in FIG. 11(a) spread out on a plane. The rear panel 344 functions as a reaction force surface that receives a reaction force from the steering wheel 106 (see FIG. 3) when the cushion 340 is expanded and deployed. The rear panel 344 is also nearly square in shape and is formed to approximately the same dimensions as the front panel 342.

The cushion 340 in FIG. 11(a) is formed by tilting one of the front panel 342 or rear panel 344 at approximately 45° with regard to the other and joining edges to each other. The cushion 340 of these configurations can also be used in combination with each of the aforementioned cover members similar to the cushion 320 in FIG. 3. Furthermore, the cushion 340 can also start to expand and deploy first from the lower portion to suitably receive the abdomen 142 of the occupant 138 in close proximity to the steering wheel 106 to fully restrain the occupant 138.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used in a driver's seat airbag device for restraining an occupant in an emergency.

DESCRIPTION OF CODES

100 . . . driver side airbag device, 102 . . . Seat, 104 . . . Cushion, 104a . . . Upper portion of cushion, 104b . . . Lower portion of cushion, 105 . . . Airbag module, 106 . . . Steering wheel, 108 . . . Hub, 109 . . . Housing portion, 110 . . . Cover member, 112 . . . Inflator, 114 . . . Rim, 116 . . . Gas discharge port, 118 . . . Stud bolt, 120 . . . Front panel, 120a . . . Upper end of front panel, 122 . . . Rear panel, 124 . . . Side panel, 126a, 126b . . . Vent hole, 138 . . . Occupant, 140 . . . Head, 142 . . . Abdomen, 150 . . . Design region, 152 . . . Wall portion, 160 . . . Thin-walled portion, 160a . . . First plate thickness portion, 162a, 162b . . . Cover door, 164 . . . Emblem, 166a, 166b . . . Hinge, 200 . . . Cover member of first modified example, 202 . . . Lower end of design region of cover member, 220 . . . Cover member of second modified example, 240 . . . Cover member of third modified example, 242a to 242c . . . Cover door, 244a to 244c . . . Hinge, 246 . . . Thin-walled portion, 260 . . . Cover member of fourth modified example, 262a to 262d . . . Cover door, 264a to 264d . . . Hinge, 266 . . . Thin-walled portion, 300 . . . Cover member of fifth modified example, 302 . . . Design region, 304 . . . Cover door, 306 . . . Emblem, 308 . . . Thin-walled portion, 308a . . . Second plate thickness portion, 308b, 308c . . . Intermediate portion, 308d, 308e . . . First plate thickness portion, 310 . . . Hinge, 312 . . . Midway point, 320 . . . Cushion of first modified example, 322 . . . Front panel, 324 . . . Rear panel, 326 . . . Securing region, 340 . . . Cushion of second modified example, 342 . . . Front panel, 344 . . . Rear panel, D1 to D6 . . . Second plate thickness portion, E1 . . . Lower portion region of design region, E2 . . . Upper portion region of design region, F1 . . . Space portion above cover member, L1 . . . Virtual line extending from center of rear panel, L2 . . . Boundary between side panel and front panel, P1 . . . Center of front panel, P2 . . . Center of rear panel in height direction, P3 . . . Center of gravity of head, P4 . . . Center of gravity of emblem, T . . . Original plate thickness of design region, t1 . . . Plate thickness of second plate thickness portion, t2 . . . Plate thickness of first plate thickness portion, W1 . . . Width of upper portion of cushion, W2 . . . Width of lower portion of cushion

The invention claimed is:

1. A driver side airbag device, comprising:
a steering wheel of a vehicle; and
an airbag module containing an inflator and an airbag cushion, which is stored in the steering wheel; wherein the steering wheel contains:
a housing portion that stores the airbag module; and
a cover member that closes the housing portion,
the cover member contains:
a design region facing an occupant side; and
a thin-walled portion formed by reducing a thickness of the design region along a predetermined range from an upper portion to a lower portion of the design region and that is cleaved open by an expansion pressure of the airbag cushion to open the predetermined range as one or a plurality of cover doors, wherein the thin-walled portion includes a first straight line portion along a vertical axis of the design region in the upper portion of the design region, a second straight line portion along the vertical axis of the design region in the lower portion of the design region, and a curved line portion connecting the first straight line portion and the second straight line portion,
the thin-walled portion contains a first plate thickness portion having a predetermined thickness and a second plate thickness portion that is thinner than the first plate thickness portion, and
the second plate thickness portion is formed at least in the curved line portion of the thin-walled portion in the lower portion of the design region, wherein the second plate thickness portion is formed to reach a lower end vicinity of the design region.

2. The driver side airbag device according to claim 1, wherein the second plate thickness portion is also formed from the lower portion to the upper portion of the design region, and
the second plate thickness portion is formed over a longer range in the lower portion of the design region than in the upper portion.

3. The driver side airbag device according to claim 2, wherein a ratio of providing the second plate thickness portion (upper portion:lower portion) is within a range of 1:3 to 1:20.

4. The driver side airbag device according to claim 1, wherein a predetermined emblem is arranged in the design region, and
the upper portion and lower portion of the design region are divided based on a position of a center of gravity of the emblem.

5. The driver side airbag device according to claim 1, wherein a plate thickness of the design region is within a range of 2.0 mm to 3.5 mm, and
a plate thickness of the second plate thickness portion is within a range of 0.4 mm to 0.7 mm.

6. The driver side airbag device according to claim 1, wherein the thin-walled portion is formed such that the cover door is two cover doors that open to the left and right.

7. The driver side airbag device according to claim 1, wherein the thin-walled portion is formed such that the cover door is two cover doors that open diagonally upward to the left and right, respectively, as viewed from a center of the design region.

8. The driver side airbag device according to claim 1, wherein the thin-walled portion is formed such that the cover door is four cover doors that open diagonally upward to the left and right and diagonally downward to the left and right, respectively, for a total of four directions, as viewed from a center of the design region.

9. The driver side airbag device according to claim 1, wherein the steering wheel further contains:
a non-circular rim other than a circular ring; and
a predetermined space portion in which the rim formed above the cover member is not present, and
the cover door opens so as to cover at least a portion of the space portion.

10. A driver side airbag device, comprising:
a steering wheel of a vehicle; and
an airbag module containing an inflator and an airbag cushion, which is stored in the steering wheel; wherein the steering wheel contains:
a housing portion that stores the airbag module; and
a cover member that closes the housing portion,
the cover member contains:
a design region facing an occupant side; and
a thin-walled portion formed by reducing a thickness of the design region along a predetermined range and that is cleaved open by an expansion pressure of the airbag cushion to open the predetermined range as one or a plurality of cover doors, wherein the thin-walled portion includes a straight line portion along a vertical axis of the design region in a lower portion of the design region, and a curved line portion curving around an emblem of the design portion, wherein the thin-walled portion is formed such that the cover door is two cover doors that open diagonally upward to the left and right, respectively, as viewed from a center of the design region,
the thin-walled portion contains a first plate thickness portion having a predetermined thickness and a second plate thickness portion that is thinner than the first plate thickness portion, and
the second plate thickness portion is formed at least in the curved line portion of the thin-walled portion.

11. The driver side airbag device according to claim 10, wherein an upper portion and the lower portion of the design region are divided based on a position of a center of gravity of the emblem.

12. A driver side airbag device, comprising:
a steering wheel of a vehicle; and
an airbag module containing an inflator and an airbag cushion, which is stored in the steering wheel; wherein the steering wheel contains:
a housing portion that stores the airbag module; and
a cover member that closes the housing portion,
the cover member contains:
a design region facing an occupant side; and
a thin-walled portion formed by reducing a thickness of the design region along a predetermined range from an upper portion to a lower portion of the design region and that is cleaved open by an expansion pressure of the airbag cushion to open the predetermined range as one or a plurality of cover doors, wherein the thin-walled portion includes a first straight line portion along a vertical axis of the design region in the upper portion of the design region, a second straight line portion along the vertical axis of the design region in the lower portion of the design region, and a curved line portion connecting the first straight line portion and the second straight line portion,
the thin-walled portion contains a first plate thickness portion and a second plate thickness portion that is thinner than the first plate thickness portion, wherein the second plate thickness portion is formed from the lower portion to the upper portion of the design region and in the curved line portion of the thin-walled portion in the lower portion of the design region, wherein the second plate thickness portion is formed over a longer range in the lower portion of the design region than in the upper portion of the design region.

13. The driver side airbag device of claim 12, wherein a ratio of providing the second plate thickness portion (upper portion:lower portion) is within a range of 1:3 to 1:20.

* * * * *